United States Patent [19]
Wagner

[11] Patent Number: 4,642,002
[45] Date of Patent: Feb. 10, 1987

[54] HOLDER FOR MOTOR DRIVEN TOOLS

[75] Inventor: Rudolf Wagner, Stuttgart, Fed. Rep. of Germany

[73] Assignee: REMS-WERK Christian Föll und Söhne GmbH & Co., Waiblingen, Fed. Rep. of Germany

[21] Appl. No.: 559,914

[22] Filed: Dec. 9, 1983

[30] Foreign Application Priority Data

Dec. 11, 1982 [DE] Fed. Rep. of Germany ....... 3245894

[51] Int. Cl.⁴ ............................................... B23G 1/24
[52] U.S. Cl. ................................. 408/105; 10/123 P; 408/238
[58] Field of Search ............... 408/103, 104, 105, 106, 408/712, 107, 108, 121, 138, 238, 239 R, 239 A, 240; 82/41; 269/131, 168; 10/89 P, 107 R, 107 F, 107 M, 107 PH, 123 R, 123 P, 123 S

[56] References Cited

U.S. PATENT DOCUMENTS

| | | | |
|---|---|---|---|
| 555,751 | 3/1896 | Aichele | 82/41 |
| 1,548,506 | 8/1925 | Bogtman | 408/709 X |
| 2,092,997 | 9/1937 | Wilson | 82/41 |
| 2,472,083 | 6/1949 | Bartholdy | 408/109 X |
| 2,552,686 | 5/1951 | Lopez | 82/41 X |
| 2,645,951 | 7/1953 | Sponsler | 408/103 |
| 2,857,797 | 10/1958 | Rodriguez | 82/41 |
| 3,132,563 | 5/1964 | Barnum | 408/103 |
| 3,316,571 | 5/1967 | Cutrone | 408/105 X |
| 3,362,447 | 1/1968 | Elden, Jr. | 408/109 |
| 4,349,931 | 9/1982 | Leon | 408/138 X |
| 4,405,267 | 9/1983 | Stolnen | 10/123 P X |
| 4,501,519 | 2/1985 | Leon | 408/138 X |

*Primary Examiner*—Gil Weidenfeld
*Assistant Examiner*—Glenn L. Webb
*Attorney, Agent, or Firm*—Becker & Becker, Inc.

[57] ABSTRACT

A holder for supporting motor driven tools against the reaction torque which occurs during operation. Two supports which are spaced from one another are provided for the tool. The supports are rigidly connected with a clamping device. Since only one support is effective at any given time for a given direction of rotation of the tool, the direction of rotation of the latter can be changed without having to modify the holder. The holder, together with the clamping device, is fastened directly onto the workpiece.

26 Claims, 6 Drawing Figures

HOLDER FOR MOTOR DRIVEN TOOLS

BACKGROUND OF THE INVENTION

1. Field of the Invention

The present invention relates to a holder for motor driven tools, especially motor driven diestocks. The holder has support means for supporting the tool against the reaction torque which occurs during operation. The support means is connected with a clamping device which has a spindle and which serves for securing onto a workpiece to be handled.

2. Description of the Prior Art

Holders of this type serve to support the motor driven tools against the reaction torque which occurs during operation. Such motor driven tools are, for example, motor driven diestocks, the die head of which is rotatably driven by an electric motor. This diestock is placed upon the workpiece which is to be handled. Furthermore, at a distance from the end of the workpiece which is to be handled, the holder is supported on the diestock by means of the support means. The clamping device comprises a U-shaped receiving and holding means for the workpiece. One arm of a U-shaped bracket is connected to one arm of the U-shaped receiving and holding means. The other arm of the bracket is provided with a locking or securing device which is embodied as a hook and extends over the other arm of the receiving and holding means of the clamping device in the locking or securing position. The spindle is mounted in the bracket, and can be moved with a clamping part on the arms of the receiving and holding means and the bracket. To clamp the workpiece in position, the securing device must be loosened and the bracket must be swung out about the pivot axis, so that the workpiece can be inserted into the receiving and holding means of the clamping device. As a result of the pivotable bracket and the locking or securing parts, the clamping device is structurally complicated and is not favorable for handling. When the holder is utilized, it is necessary to frequently change workpieces, so that the involved and inconvenient handling of the clamping device is particularly disadvantageous. Furthermore, due to the structurally complicated clamping device, the holder is very heavy. Therefore, the holder is practically as heavy as the diestock in conjunction with which it is generally used. Finally, the clamping device is susceptible to problems since, as a result of the turnings which are produced during operation, the danger very readily exists that the pivotability of the bracket and/or the holding or securing of the bracket on the clamping device are impaired.

An object of the present invention is to design a holder of the aforementioned general type in such a way that, while providing favorable support of the motor driven tool against the reaction torque which occurs, the holder is structurally simple and light weight.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
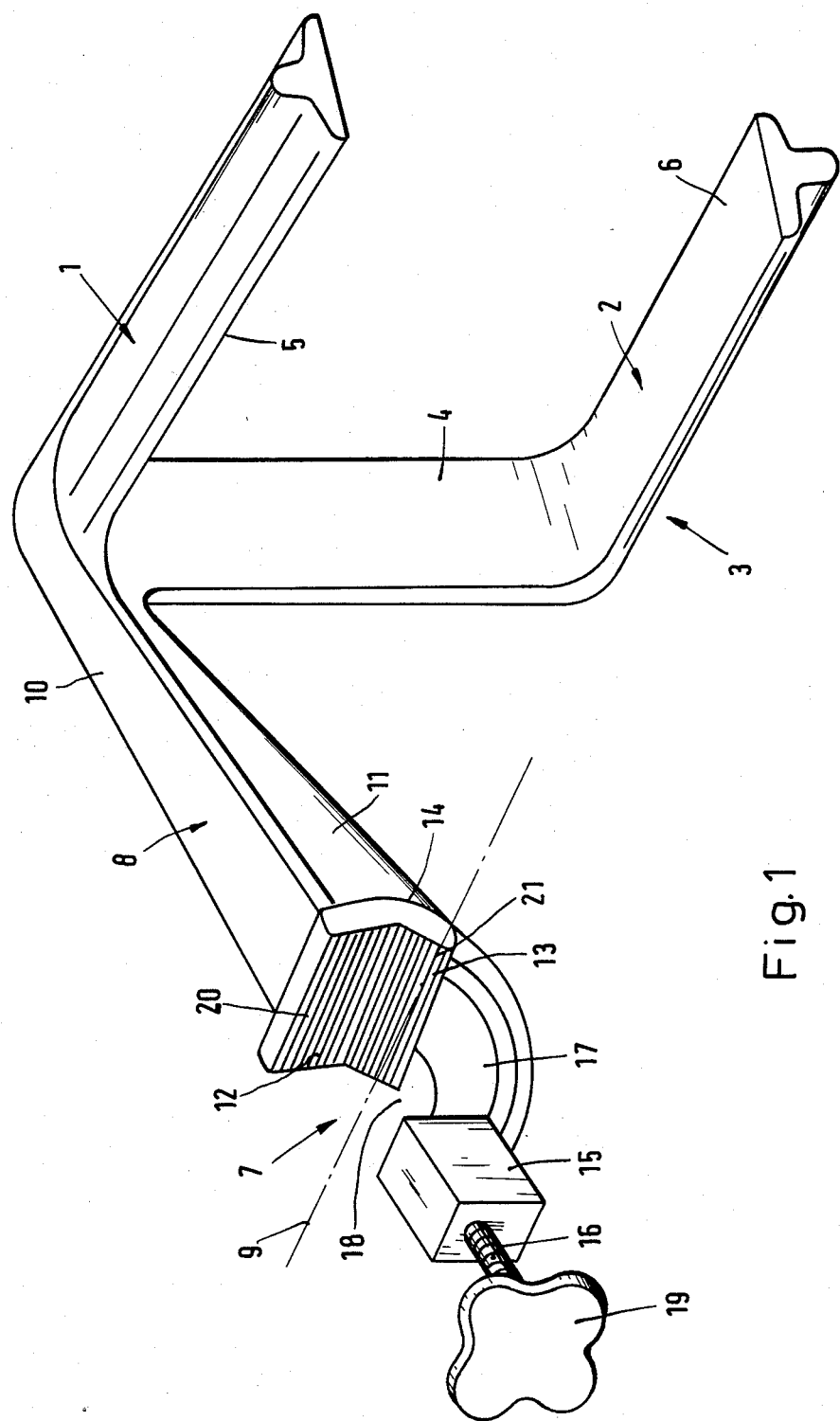
FIG. 1 is a view that shows one embodiment of the inventive holder.

The holder of the present invention is characterized primarily in that the spindle is fixed to the clamping device, and that the clamping device is rigidly provided on the holder and is open transverse to an axis of the clamping device which determines the position of the workpiece.

Pursuant to the inventive holder, the clamping device is rigidly provided thereon. Therefore, movable or pivotable clamping device parts are eliminated, so that even after the holder has been used for a long time, a reliable securing of the workpieces which are to be handled can be readily insured. Since the spindle is fixed to the clamping device, it is necessary only, once the workpiece has been inserted into the receiving and holding means of the clamping device, to screw the spindle in the appropriate direction to secure the workpiece. Operation of the inventive holder is therefore quite simple. Since the clamping device is open transverse to the axis of the workpiece, the workpiece can be introduced transversely into the clamping device in a simple manner, and does not have to be inserted into the receiving and holding means in the direction of its longitudinal axis. This considerably simplifies and speeds up exchange of workpieces. Due to the structurally simple construction, the clamping device is maintenance-free, is easy to operate, and is light weight. As a result, the holder is particularly favorable for portable tools, especially for portable diestocks.

The clamping device may have at least one, and preferably two, toothed clamping jaws which are located across from the spindle. The spindle may be provided with a spindle nut which is arranged on one end of the clamping device. The clamping jaws may extend laterally beyond the intermediate piece. The free end of the spindle may be embodied as a hollow point.

Pursuant to a further inventive resolution of the object of the present invention, the holder may be characterized in that it is provided with a further support which is spaced from the other support and supports the tool against a reaction torque which occurs when the direction of rotation is reversed; and in that the further support is rigidly connected with the other support and with the clamping device. According to this resolution, two supports which are disposed across from one another are provided for the tool, which in the working position is disposed between the two supports. Since each one of these supports is associated with a given direction of rotation, the direction of rotation of the tool can be changed without having to modify the holder. The tool itself requires no separate abutment or rest, since the two supports are available for this purpose. As a result, no projecting abutments have to be provided on the motor driven tool; such abutments could, under certain circumstances interfere with operation, for example when the tool is being operated without the holder. It also is not necessary for the user to have to consider ahead of time which direction of rotation the tool must maintain in order to achieve the desired support against the reaction torque. The holder can be mounted together with the clamping device directly on the workpiece which is to be handled, so that no additional mounting possibilities on a work bench, a tube vice, or the like has to be provided. The holder with the two supports also is structurally simple, can be easily handled by the user, which is of great advantage especially during use at construction sites or the like, and is light weight.

The two supports may be at least approximately parallel to that axis of the clamping device which determines the position of the workpiece. The two supports may form the legs of a U-shaped bracket which is connected with the clamping device via the intermediate piece. This intermediate piece may be an arm which is connected to the bracket at the level of one of the supports, preferably the upper support when viewed in the working position; the intermediate piece may extend at right angles to the central plane of the bracket which intersects the crosspiece thereof.

The intermediate piece may have a barrel-shaped cross section. The supports may be embodied as profiled bars, and preferably have a T-shaped cross section. The holder may be cast from a single piece, preferably from spheroidal graphite cast iron.

The spindle may be disposed at an acute angle relative to the longitudinal axis of the intermediate piece. The location at which the cutting force is applied, and the location at which the tool is supported on one of the supports, may be disposed at least approximately in a common plane which extends transverse to the axis of the clamping device.

DESCRIPTION OF PREFERRED EMBODIMENTS

Referring now to the drawings in detail, the embodiment of the holder shown in FIG. 1 has a clamping device 7 and two bar-shaped supports 1 and 2 which extend at least approximately parallel to one another, and preferably have the same length. These supports 1 and 2 form the legs of a U-shaped bracket 3, and are connected with one another by means of a crosspiece 4. The bracket 3 assures a high rigidity, so that the reaction torque which occurs during operation of the tool can be reliably absorbed. To increase their rigidity, the supports 1 and 2 are embodied as profiled bars which preferably have a T-shaped cross section. The two supports 1 and 2 are mirror symmetric to the central plane which intersects the crosspiece 4. In order to obtain a flat support surface for the tool 22 (FIG. 2), the supports 1 and 2 are arranged in such a way that their flat surfaces 5 and 6 face one another. The crosspiece 4 preferably also has a T-shaped cross section. One end of each of the supports 1 and 2 merges into the wide side of the crosspiece 4.

The clamping device 7 is connected with the bracket 3 by means of an intermediate piece 8. As a result, there is created between the supports 1 and 2 on the one hand, and the clamping device 7 on the other hand, that distance which is required in order to place a tool, for example, a diestock 22, on a workpiece 23 which is fixed in the clamping device 7, and to be able to pass the tool between the two supports 1 and 2. The two supports 1 and 2 are at least approximately parallel to the axis 9 of the clamping device 7, so that the diestock arm 24 of the diestock 22, which is run by an electric motor, can be disposed between the supports 1 and 2. The holder is preferably cast from a single piece, especially from spheroidal graphite cast iron, for example. This makes possible particularly to harden or temper the clamping jaws 12 and 13 of the clamping device 7.

The intermediate piece 8 is embodied as a straight arm which is connected to the bracket 3 at the level of one of the supports, preferably at the level of the upper support 1 when viewed in the operating position; the arm is also disposed at right angles to the central plain of the bracket, i.e., at right angles to the supports 1 and 2. That end of the intermediate piece 8 which is remote from the clamping device 7 is connected to the narrow side of the cross piece 4 and to the upper support 1. So that the intermediate piece 8 has a sufficient rigidity and can withstand the stresses which occur during operation with the tool, the intermediate piece 8, in the embodiment of FIG. 1, has an L-shaped or T-shaped cross section. In the corner region of the bracket 3, the one leg 10 of the intermediate piece 8 is connected to the support 1, while the other leg 11 of the intermediate piece 8 is connected to the narrow side of the crosspiece 4. In conjunction with the vertical positioning of the intermediate piece 8 relative to the bracket 3, such a profiling enables a sufficient resistance against the formation of cracks and against separation of the intermediate piece from the bracket to be provided in this transistion region. The corner regions of the holder are rounded off for strength reasons.

The leg 10 of the intermediate piece 8 is tapered in the direction toward the bracket 3, and has greatest width thereof in the region of the clamping device 7.

The clamping device 7 has at least one clamping jaw, and preferably has the two elongated clamping jaws 12 and 13, which are made of a single piece and form clamping surfaces which adjoin one another at an obtuse angle. The back side 14 of the clamping jaws has the shape of part of a cylinder, and is convexly curved in the direction toward the intermediate piece 8, as a result of which the connection surface for the legs 10 and 11 of the intermediate piece 8 is enlarged. A spindle nut 15, in which a chucking spindle 16 is guided, is disposed across from the two clamping jaws 12 and 13. The nut 15 and the jaws 12 and 13 are connected with one another by a connecting piece 17 which is preferably curved. The spindle nut 15, the connecting piece 17, and the two clamping jaws 12 and 13 define a receiving and holding means 18 for the workpiece which is to be handled. Since the connecting piece 17 is curved, a workpiece, for example a tube, having a relatively large diameter also can be clamped in the holding means 18. For ease of operation, the free end of the chucking spindle 16 is provided with a handle 19, the rim of which is formed with indentations.

Figure 3:
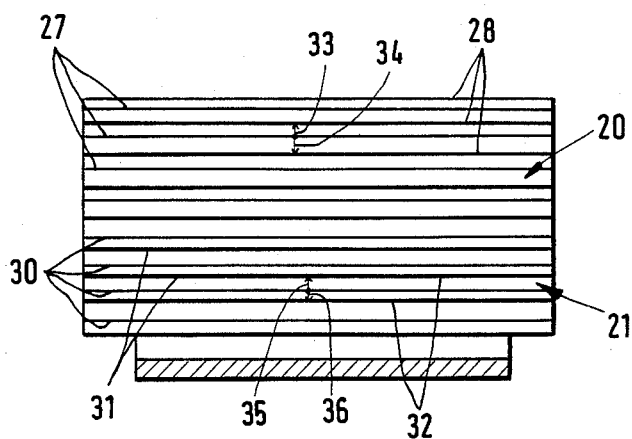
FIG. 3 is a plan view, to an enlarged scale, of a clamping device of the inventive holder.
Figure 4:
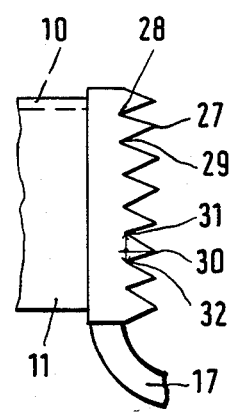
FIG. 4 is a side view of the clamping device of FIG. 3.

The receiving and holding means 18 of the holder is placed on the workpiece 23, for instance a tube, which is to be handled at a distance from the end thereof. The chucking spindle 16 then is moved by means of the handle 19 against the workpiece which is positioned in the receiving and holding means 18; the workpiece is fixed thereby against the clamping jaws 12 and 13. In order to assure a hold of the holder on the tube which is secure against turning, the clamping jaws 12 and 13 are provided with teeth 20, 21, the top edges or recesses of which preferably extend parallel to the axis 9 of the clamping device 7. Each tooth 20 is embodied in such a way that in plan view (FIGS. 3 and 4), the top edge 27 of a tooth 20 is not spaced as far (the distance 33) from that root edge 28 of a tooth 20 which is on that side facing the leg 10 of the intermediate piece 8 as said top edge 27 is (the distance 34) from the other root edge 29 of a tooth 20. In contrast, each tooth 21 is embodied in such a way that the top edge 30 of a tooth 21 is spaced further (the distance 35) from that root edge 31 of a tooth 21 which is on that side facing the leg 10 than said top edge 30 is (the distance 36) from the other root edge 32 of a tooth 21 which is on that side facing away from the leg 10.

Figure 2:
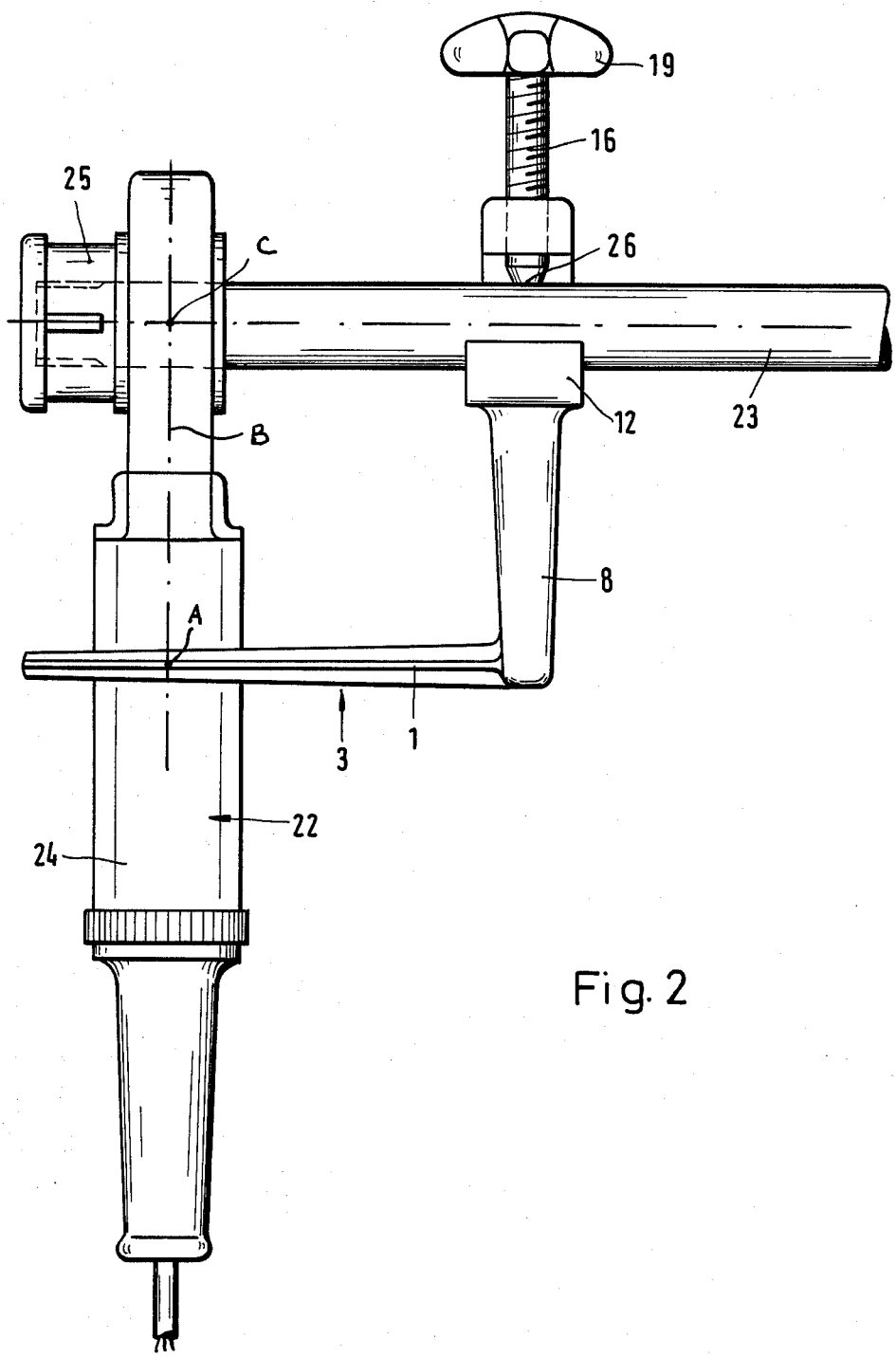
FIG. 2 is a plan view of the holder in the working position.

The workpiece 23 preferably is held so tightly against the clamping jaws 12 and 13 with the chucking spindle 16 that the teeth 20, 21 press into the workpiece. As a result of the aforementioned embodiment of the teeth 20, 21, when viewed in the direction of rotation, the teeth 20 press into the workpiece 23 when a right handed thread is being cut, and the teeth 21 press into the workpiece 23 when a left handed thread is being cut. Consequently, an absolutely secure holding of the holder on the workpiece is assured. The pressed-in teeth 20, 21 insure that the holder cannot turn about the workpiece during operation of the tool. In order to obtain as great a support surface as possible, the clamping jaws 12 and 13 project beyond both sides of the leg 10 of the intermediate piece 8. As shown in FIG. 2, the free end 26 of the spindle 16 is embodied as a hollow point; in other words, it has a circumferential edge which defines a recess portion on the end face of the spindle. As a result, the spindle bites or clamps firmly against the workpiece 23. Even if the spindle 16 is not to be firmly pulled in during chucking, it will automatically press against the workpiece 23 due to the hollow point.

After the holder has been fastened to the workpiece 23, the die head 25 of the tool, in this embodiment the diestock 22, is placed upon the free end of the workpiece; in so doing, the diestock arm 24 is inserted between the two supports 1 and 2 (FIG. 2). The die head 25 can now be rotatably driven by the electric motor. Depending upon the direction of rotation, the diestock 22, as a result of the reaction torque which occurs, is supported on one or the other of the supports 1 and 2. Since the workpiece to be handled is securely connected with the holder, workpiece does not have to be clamped in a vice, nor does the workpiece have to be supported on a work bench or the like. The two supports 1 and 2 embrace the tool 22, so that the operator does not have to pay attention to which direction of rotation the die head 25 has relative to the position of the holder to the workpiece 23. Support of the tool on the supports against the reaction torque is insured in every situation. As shown in FIG. 1, the receiving and holding means 18 of the clamping device 7 is open toward the top, when viewed in the working position shown in FIG. 2. If a right-hand thread is to be cut, as is generally the case, the tool is then supported on the upper support 1. In so doing, a force is exerted via the intermediate piece 8 on the clamping jaws 12 and 13. The force is thus pressed in the direction toward the spindle nut 15, and hence in the direction of closure of the receiving and holding means 18, so that during operation, the workpiece 23 is very securely held in the holding means 18.

The holder is fastened to the workpiece which is to be handled by means of the clamping device 7 in such a way that the holder does not tip, even under high stress.

Figure 5:
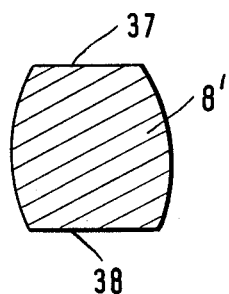
FIG. 5 is a sectional-view through a second embodiment of an intermediate piece of the inventive holder.

As shown in FIG. 5, the intermediate piece 8' also can have a somewhat rounded cross section with flattened portions 37 and 38 on the top and bottom relative to the position of the holder shown in FIG. 1; a particularly high rigidity and torsional strength can be achieved with this cross-sectional shape.

Figure 6:
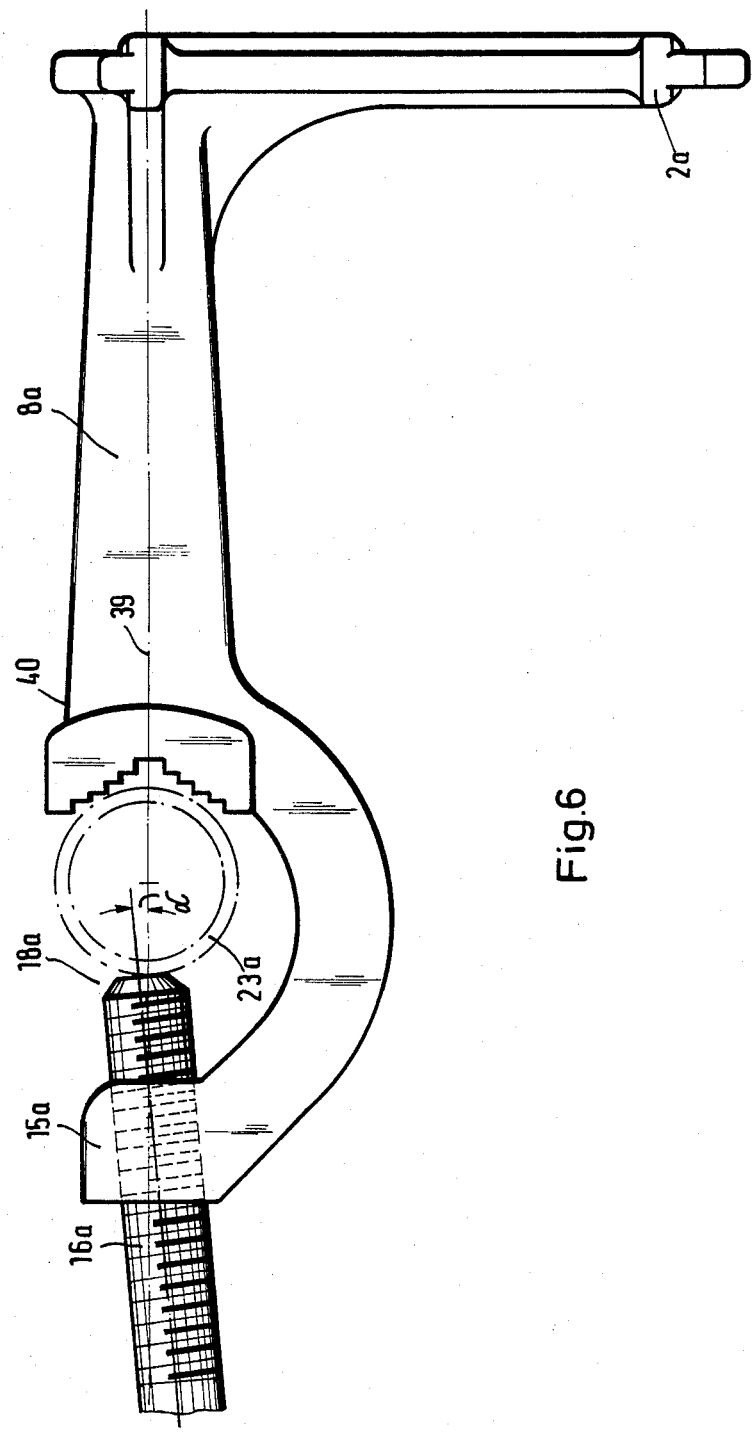
FIG. 6 is a side view of a second embodiment of the inventive holder.

In the embodiment illustrated in FIG. 6, the spindle 16a of which only a portion is illustrated, is disposed at an acute angle to the longitudinal axis 39 of the intermediate piece 8a; this angle is preferably approximately 5°. From the spindle nut 15a, the spindle 16a is directed upwardly at an angle toward the surface 40 which faces away from the support 2a. Due to this positioning, the workpiece 23a located in the receiving and holding means 18a is secured particularly reliably therein when a thread is being cut. In other respects, the holder embodiment of FIG. 6 is constructed in the same manner as the embodiment previously described.

As shown in FIG. 2, the diestock 22 is supported at the location A on the bracket 3 against the moment of reaction which occurs during thread-cutting. The cutting force during thread-cutting is applied at the location C. Since both of the locations A and C are disposed at least approximately in the same plane B, which extends transversely, preferably at right angles, to the axis 9 of the clamping device 7, the diestock 22 is prevented from moving out of the plane B during the thread-cutting. Consequently, no tilting occurs between the holder and the diestock 22, so that very neat threads can be cut.

The present invention is, of course, in no way restricted to the specific disclosure of the specification and drawings, but also encompasses any modifications within the scope of the appended claims.

What I claim is:

1. A holder for a motor-driven tool, especially a motor-driven thread-cutting diestock, comprising:
    support means for supporting said tool against reaction torque which occurs during operation of said tool;
    a clamping device which is rigidly provided on said holder and is adapted to be fastened onto a workpiece which is to be handled; said clamping device having an axis which determines the position of said workpiece while allowing movement of the tool along said axis relative to the support means; said clamping device being open transverse to said axis as an aid during insertion of said workpiece therewith; said support means being connected to said clamping device, said clamping device and support means being rigidly connected with respect to each other; and
    a spindle fixed to and movable relative to said clamping device for effecting fastening of the latter onto said workpiece.

2. A holder according to claim 1, in which said clamping device is provided with two toothed clamping jaws disposed across from said spindle.

3. A holder according to claim 1, which includes a spindle nut disposed on an end of said clamping device remote from said at least one clamping jaw; said spindle is movably guided by said spindle nut.

4. A holder according to claim 1, in which one end of said spindle is disposed directly across from said at least one clamping jaw and has a hollow point.

5. A holder for a motor-driven tool, especially a motor-driven thread-cutting diestock, comprising:

support means for supporting said tool against reaction torque which occurs during operation of said tool;

a clamping device which is rigidly provided on said holder and is adapted to be fastened onto a workpiece which is to be handled; said clamping device having an axis which determines the position of said workpiece; said clamping device being open transverse to said axis as an aid during insertion of said workpiece therewith; said support means being connected to said clamping device;

a spindle fixed to and movable relative to said clamping device for effecting fastening of the latter onto said workpiece;

said clamping device being provided with at least one toothed clamping jaw disposed across from said spindle; and an intermediate piece which rigidly interconnects said support means and said clamping device; said at least one clamping jaw extending beyond the sides of said intermediate piece.

6. A holder for a motor-driven tool, especially a motor-driven thread-cutting diestock, comprising:

support means for supporting said tool against reaction torque which occurs during operation of said tool;

a clamping device which is rigidly provided on said holder and is adapted to be fastened onto a workpiece which is to be handled; said clamping device having an axis which determines the position of said workpiece; said clamping device being open transverse to said axis as an aid during insertion of said workpiece therewith; said support means being connected to said clamping device;

a spindle fixed to and movable relative to said clamping device for effecting fastening of the latter onto said workpiece; said clamping device being provided with at least one toothed clamping jaw disposed across from said spindle;

said support means including a first support and second rigidly interconnected support spaced from one another and rigidly connected to said clamping device;

said first support supports said tool against resulting torque during a first direction of rotation of said tool, and said second support supports said tool against resulting torque during the opposite direction of rotation of said tool.

7. A holder according to claim 6, in which both said first and said second support extend at least approximately parallel to said axis of said clamping device which determines the position of said workpiece.

8. A holder according to claim 7, which includes a crosspiece for effecting rigid interconnection of said first and second supports; in which said first support, said crosspiece, and said second support for a U-shaped bracket, with said supports forming the legs thereof; and which includes an intermediate piece which rigidly connects said bracket to said clamping device.

9. A holder according to claim 8, in which said intermediate piece is an arm which is connected to said bracket at the level of one of said supports, and is disposed at substantially right angles to the central plane of said bracket, which plane intersects said crosspiece.

10. A holder according to claim 9, in which said intermediate piece is connected to that support which is uppermost when said holder is in a working position.

11. A holder according to claim 8, in which said intermediate piece has a barrel-shaped cross section.

12. A holder according to claim 8, in which said supports are profiled bars.

13. A holder according to claim 12, in which said profiled supports have a T-shaped cross section.

14. A holder according to claim 8, in which said holder is a single cast piece.

15. A holder according to claim 14, in which said holder is cast from spheroidal graphite cast iron.

16. A holder according to claim 8, in which said spindle extends at an acute angle to the longitudinal axis of said intermediate piece.

17. A holder according to claim 8, in which the location where cutting force is applied to a workpiece, and the location where said tool is supported on one of said supports, are disposed at least approximately in a common plane which extends transverse to said axis of said clamping device which determines the position of said workpiece.

18. A portable motor-driven tool, especially a motor-driven tread-cutting diestock for a workpiece, comprising:

a support device which supports the tool against reaction torque encountered during operation corresponding to two opposing rotary directions of the tool;

said support device including a surface for engagement with respect to the tool or diestock in the one direction of rotation as well as a surface in the other direction of rotation;

a clamping device whereby the surfaces are connected, said clamping device being provided for fastening of the support device upon the workpiece to be machined or worked, said clamping device and said support device being rigidly connected with respect to said other;

a receiving and holding means having an axis provided therewith for the workpiece while allowing movement of the tool along said axis relative to the support device; and a chucking spindle also provided therewith;

said chucking spindle being disposed across from two clamping jaws included therewith;

a free end of said chucking spindle also being provided therewith and with the aid of which the workpiece is clampable in the holding means, whereby the two surfaces are connected with the clamping device via an intermediate piece located transverse thereto, so that the surfaces extend and are located at least substantially parallel to the axis of the receiving and holding means, which is delimited by the clamping jaw means, by the chucking spindle and a connecting piece connecting the same such that the receiving and holding means is open toward one side, whereby clamping is effected by the free end of the chucking spindle, which engages or contacts against the workpiece to be clamped or held in place thereby.

19. A portable motor-driven tool, especially a motor-driven tread-cutting diestock for a workpiece, comprising:

a support device which supports the tool against reaction torque encountered during operation corresponding to two opposing rotary directions of the tool;

said support device including a surface for engagement with respect to the tool or diestock in the one direction of rotation as well as a surface in the other direction of rotation;

the two surfaces being provided on support legs of a U-shaped bracket having a location in a predetermined plane and which is connected with the clamping device via the intermediate piece;

a clamping device whereby the surfaces are connected, said clamping device being provided for fastening of the support device upon the workpiece to be machined or worked;

a receiving and holding means having an axis provided therewith for the workpiece; and a chucking spindle also provided therewith;

said chucking spindle being disposed across from two clamping jaws included therewith;

a free end of said chucking spindle also being provided therewith and with the aid of which the workpiece is clampable in the holding means, whereby the two surfaces are connected with the clamping device via an intermediate piece located transverse thereto, so that the surfaces extend and are located at least substantially parallel to the axis of the receiving and holding means, which is delimited by the clamping jaw means, by the chucking spindle and a connecting piece connecting the same such that the receiving and holding means is open toward one side, whereby clamping is effected by the free end of the chucking spindle, which engages or contacts against the workpiece to be clamped or held in place thereby.

20. A portable support device for a tool according to claim 19, characterized thereby that the clamping jaw means project laterally over the intermediate piece.

21. A portable support device for a tool according to claim 19, characterized thereby that the free end of the chucking spindle is constructed as a hollow point or tip.

22. A portable support device for a tool according to claim 19, characterized thereby that the intermediate piece is an arm which lies in the height or level of one of the support legs, preferably in the operating or working position of upper location of one support leg connected to the bracket and located at right angles to the plane of the bracket.

23. A portable support device for a tool according to claim 19, characterized thereby that the intermediate piece has a barrel-shaped cross section.

24. A portable support device for a tool according to claim 19, characterized thereby that the support legs of the bracket are constructed as profiled or shaped rods or bars, preferably with T-shaped cross section.

25. A portable support device for a tool according to claim 19, characterized thereby that the chucking spindle is disposed at an acute angle to the longitudinal axis of the intermediate piece.

26. A portable support device for a tool according to claim 19, characterized thereby that one location at which the cutting force is applied, and another location, at which the tool is supported on the surface means, are disposed at least substantially in a common plane extending transverse to the axis of the receiving and holding means as well as the clamping device.

* * * * *